US011933029B2

(12) United States Patent
Faizan et al.

(10) Patent No.: US 11,933,029 B2
(45) Date of Patent: Mar. 19, 2024

(54) SMART SHOWER HEAD

(71) Applicant: Mirza Faizan, Irving, TX (US)

(72) Inventors: Mirza Faizan, Irving, TX (US); Ameer Syedibrahim, Farmers Branch, TX (US); Amjad Syedibrahim, Farmers Branch, TX (US); Syed Shah Ekramullah Alvi, Irving, TX (US); Binu Varghese, Glandale, CA (US); Vineet Anshuman, Sunnyvale, CA (US); Mirza Rizwan, Patna (IN); Sidra Ambreen, Plano, TX (US); Hiba Khan, Bedford, TX (US); Zainab Khan, Bedford, TX (US); Mansoor Hasan Khan, Aligarh (IN); Saadia Asaf, Aligarh (IN)

(*) Notice: Subject to any disclaimer, the term of this patent is extended or adjusted under 35 U.S.C. 154(b) by 232 days.

(21) Appl. No.: 17/338,252

(22) Filed: Jun. 3, 2021

(65) Prior Publication Data

US 2022/0389694 A1 Dec. 8, 2022

(51) Int. Cl.
*E03C 1/05* (2006.01)
*B05B 1/18* (2006.01)
*E03C 1/04* (2006.01)

(52) U.S. Cl.
CPC ................ *E03C 1/055* (2013.01); *B05B 1/18* (2013.01); *E03C 1/0408* (2013.01); *E03C 1/041* (2013.01)

(58) Field of Classification Search
CPC ........ E03C 1/055; E03C 1/0408; E03C 1/041; B05B 1/18
USPC ........................................................ 236/12.12
See application file for complete search history.

(56) References Cited

U.S. PATENT DOCUMENTS 4,085,308 A * 4/1978 Youngquist .............. H05B 3/82 219/541
11,493,210 B2 * 11/2022 Manay ................ F24D 17/0078
2012/0145807 A1 * 6/2012 Martinez ............. F24D 17/0089 239/135
2013/0333764 A1 * 12/2013 Wright .................. E03C 1/0408 137/551
2017/0050201 A1 * 2/2017 Deivasigamani .... A61B 5/6887
2019/0336988 A1 * 11/2019 Daudish ................ F24H 9/1818
2022/0379328 A1 * 12/2022 Crawford .............. B05B 9/0861

* cited by examiner

*Primary Examiner* — Justin M Jonaitis

(57) ABSTRACT

A smart shower head to regulate temperature of water being supplied is disclosed. The smart shower head comprises a showering section (101) for showering water, a shower head arm connecting the showering section (101) and supplying water to the showering section (101), and at least one compartmentalized nero-thermal coil 103 running through the length of the shower head arm (102) and the showering section (101).

10 Claims, 6 Drawing Sheets

SMART SHOWER HEAD

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

In a world starved of water, drought is a big issue. In Europe, drought conditions expand through Central Europe to the North Sea, and in Asia, drought continues throughout central Russia and from the Indian sub-Continent to eastern China and Mongolia. In Africa, drought is strongest in the west, especially in South Africa. In North America, drought holds along the western coast and through New England/US Southeast, and in South America, drought continues in Brazil from the Equator down to the Andes.

Coming to one of the prime uses of water, showering is among the leading ways in which water is wasted in a household. Around seventeen percent of all residential indoor water use or forty gallons of water are the result of wastage through showering per family in a day. Currently, no solution exists to this problem. Approximately 2.14 gallons of water are wasted every minute during such wait for the water to flow from the water heater and reach the shower head, which equals approximately 910 billion gallons wasted annually in the United States, Europe, and Australia.

During shower, one can be found shivering in cold bathroom, waiting for hot water to come from water heater and to reach the shower. Usually, when people enter the shower, they let the cold water go down the drain and wait for the hot water to arrive. Conventionally, this happens because the hot water flowing from the water heater to the shower head does not arrive immediately through the pipes and into the shower head. As a result, the cold water is not used and contributes to a huge water wastage problem. On an average, the cold water is left to run for 1-2 minutes. Thus, a single shower wastes 3-5 gallons of clean water during this period of time.

Therefore, there arises a need for a smart shower wherein the wastage of cold water and time is eliminated. The smart Shower comprises a smart shower head that is designed specifically to target this problem. The key purpose is to conserve the water which is wasted when one waits for the hot water to come from water heater to the showerhead (on average, the water travels through 50 feet of piping). The Water Management Industry under utilities, which includes gas, power, and water firms can make the best use of the present disclosure. This industry consumes over half the water that is available to human use.

OBJECTIVE OF THE INVENTION

The present disclosure is aimed at providing a smart shower head for controlling the massive wastage of water and time.

Another objective of the present disclosure is to provide a smart shower head with compartmentalized heating coils capable of quickly heating the water.

Yet another objective of the present disclosure is to provide a smart shower head that is energy efficient.

SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

In an embodiment of the present disclosure, a smart shower head to regulate temperature of water being supplied is disclosed. The smart shower head comprises a showering section for showering water, a shower head arm connecting the showering section and supplying water to the showering section; and at least one compartmentalized nero-thermal coil running through the length of the head arm and the showering section.

According to an embodiment of the present invention, the compartmentalized nero-thermal coil is made of nichrome.

According to an embodiment of the present invention, the smart shower head further comprises at least one nozzle in the showering section for showering water.

According to an embodiment of the present invention,

According to an embodiment of the present invention, the smart shower head further comprises at least one water reservoir in the showering section for collecting water.

According to an embodiment of the present invention, the smart shower head further comprises a temperature regulator for adjusting the temperature of the nero-thermal coil.

According to an embodiment of the present invention, the smart shower head further comprises a demand sensor for detecting a hot shower demand.

According to an embodiment of the present invention, the demand sensor is connected to a tap.

According to an embodiment of the present invention, the smart shower head further comprises a switching unit connected to the demand sensor and to a main water heating unit, wherein the switching unit activates the temperature regulation unit on detecting the hot shower demand, and wherein the switching unit deactivates the temperature regulation unit on detecting the inflow of hot water from the main water heating unit.

According to an embodiment of the present invention, the smart shower device comprises a bluetooth compatible chip configured to be wirelessly connected to a remote device via a transmitter, wherein the remote device is a smart phone device.

According to an embodiment of the present invention, the smart shower device further comprises a lithium ion battery to power the at least one compartmentalized nero-thermal coil.

BRIEF DESCRIPTION OF DRAWINGS

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

Figure 1:
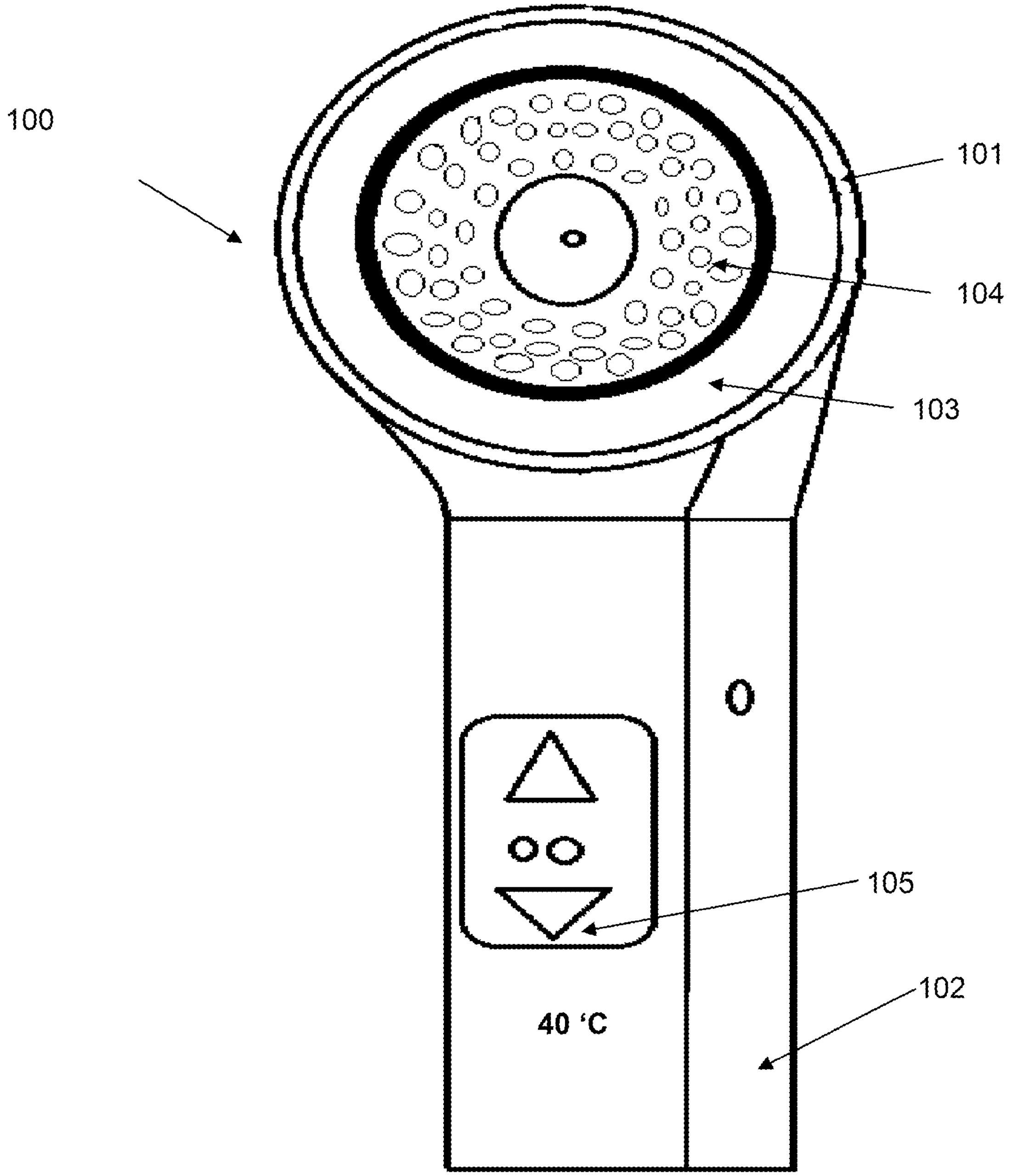
FIG. 1 illustrates an interior isometric view of a smart shower head, in accordance with an embodiment of the present disclosure.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The term "some" as used herein is to be understood as "none or one or more than one or all." Accordingly, the terms "none," "one," "more than one," "more than one, but not all" or "all" would all fall under the definition of "some." The term "some embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skills in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below. Embodiments of the present invention will be described below in detail with reference to the accompanying drawings.

The present disclosure provides a smart shower head 100 for shower water while regulating the temperature of the water being showered in less time and thus saving time, energy, and water. Said smart shower may be connected to the utility sites that already have a connection with a main water heating unit that may be a domestic geyser according to an exemplary embodiment of the present disclosure.

Figure 2:
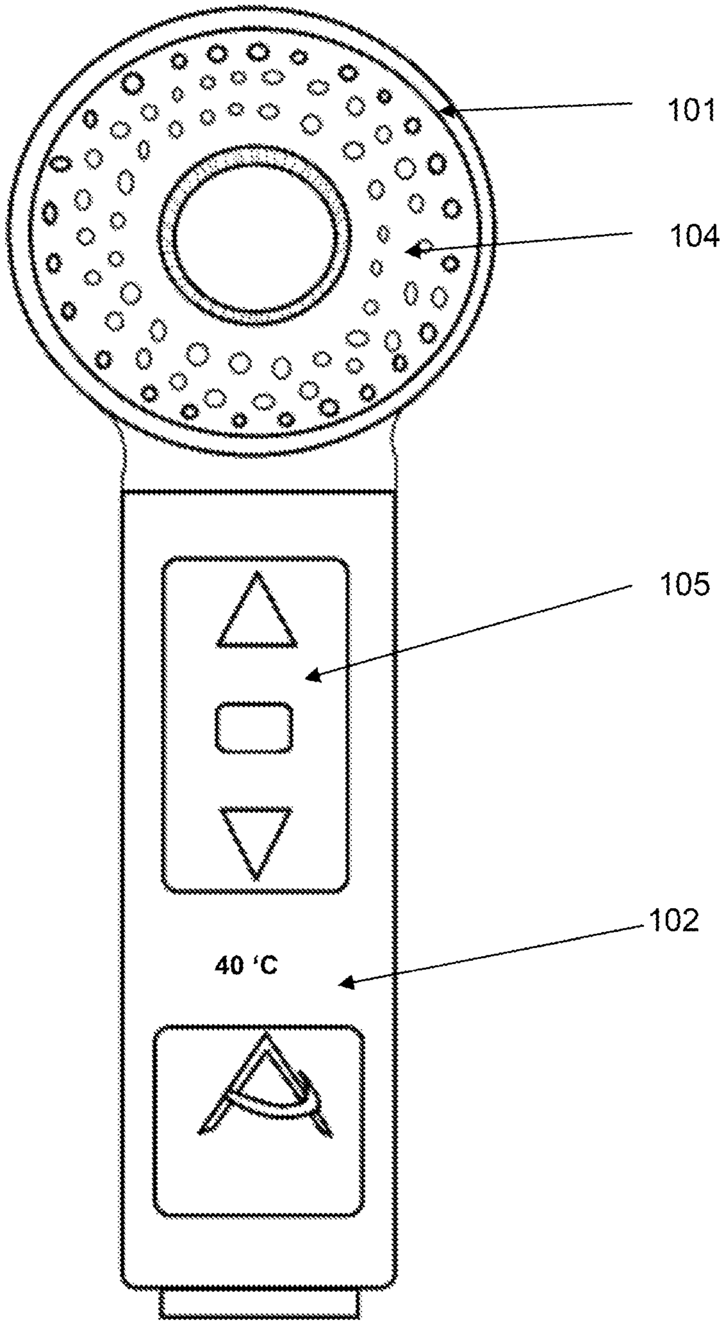
FIG. 2 illustrates an exterior isometric view of the smart shower head, in accordance with an embodiment of the disclosure.
Figure 9A:
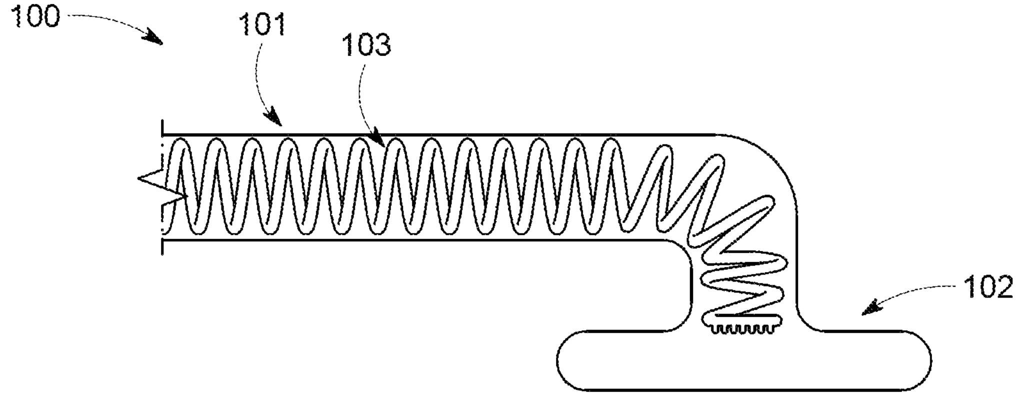
Figure 9B:
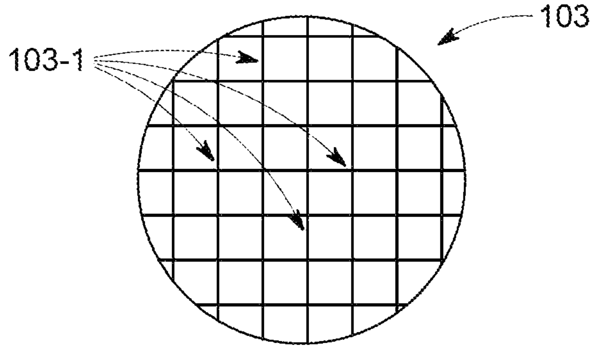

FIG. 1, and FIG. 2 illustrate different views (interior isometric view, and exterior isometric view respectively) of the smart shower head 100, in accordance with an embodiment of the present disclosure. The smart shower head 100 may comprise a showering section 101 for showering water, a shower head arm 102 connecting the showering section 101 and supplying water to the showering section 101, and a temperature regulation unit comprising at least one compartmentalized nero-thermal coil 103 running through the length of the shower head arm 102, wherein bottom face of the shower head arm 102 may comprise a temperature regulator 105 and the showering section 101. Cross-sectional view of the smart shower head 100 is further illustrated with respect to FIG. 9A. Cross-sectional view of the nero-thermal coil 103 separated into subsections 103-1 is further illustrated with respect to FIG. 9B.

The smart shower head 100 may be made of a chrome plated body according to an embodiment. Said body may be modified to a non-aerating low flow shower head 100 which is best known for saving water. The non-aerating aspect is merely just a specific sub category of low flow shower heads known to regulate temperature well and deliver a strong spray. In short, non-aerating shower heads provide more of a massaging effect for users, making it more desirable. The smart shower head 100 may also consist of a stainless-steel finish. Stainless steel is a strong, impact resistant, and non-porous metal, making it the perfect for use as a coating on our showerhead.

In an embodiment, when the user switches on the tap, the water flows through the main heating unit to the smart shower head 100. A demand sensor in the smart shower head 100 connected to the tap detects a hot shower demand. The smart shower head 100 further comprises a switching unit connected to the demand sensor and to a main water heating unit. Said switching unit activates the temperature regulation unit on detecting the hot shower demand.

On activating the temperature regulation unit, the cold water first flows into the shower head arm 102, it enters the compartmentalized nero-thermal coil 103.

Figure 3:
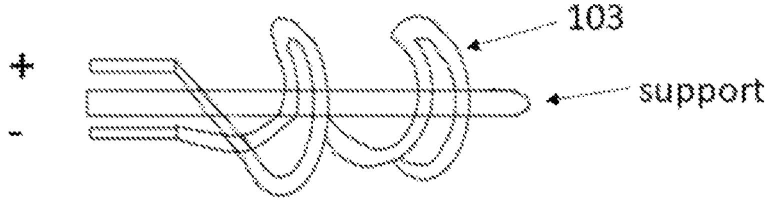
FIG. 3 and FIG. 4 illustrate a nero-thermal coil in the smart shower head, in accordance with an embodiment of the present disclosure.
Figure 4:
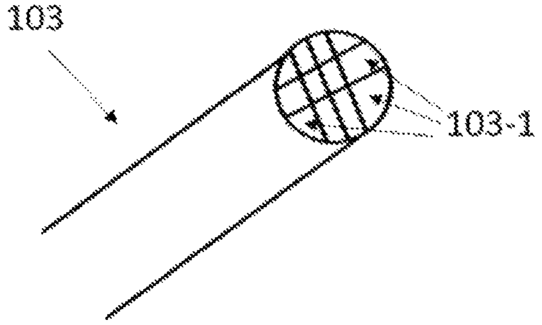

FIG. 3 and FIG. 4 illustrate a nero-thermal coil 103 in the smart shower head 100, in accordance with an embodiment of the present disclosure. Compartmentalized nero-thermal coil 103 is based on a technology developed and named Nero-Thermal coil 103. The interior of the nero-thermal coil 103 is separated into 12 subsections 103-1. This new technology has been implemented as a solution to a problem currently encountered in a standard tubular heating coil, wherein the water in the inside will not receive the same amount of heat as the outside. This was a major issue since the sole purpose of the heating coil is to deliver evenly heated water as quickly as possible. Separating Nero-Thermal Coil 103 into smaller sections increases metal-to-water contact as it flows through the pipes and allows the water to heated through direct contact in a matter of seconds. The different “walls” within the coil create even distribution and faster conduction of heat.

According to an embodiment, the nero-thermal coil 103 may be composed of nichrome. Nichrome, an alloy of nickel and chromium, is the prime matter for it due to its high thermal conductivity and its corrosion resistance. This is very important for the overall efficiency of the smart shower head 100 since a heating coil with high thermal conductivity leads to better heated water that retains its heat for a longer period of time. To further increase the heating efficiency of the heating coil, ‘Nero-Thermal technology’ has been incorporated as discussed above. This technology is consisting of cutting a solid, non-hollow tubular heating coil to form a circular gridded cross section. The result is a collection of distinct pockets through which cold water can travel through.

Figure 5:
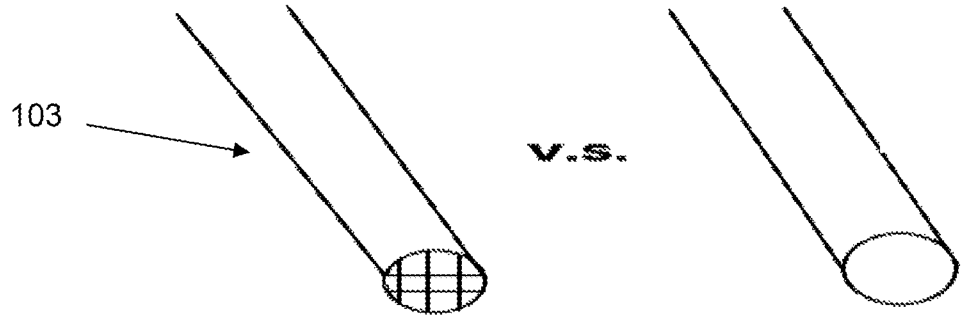
FIG. 5 illustrates a comparison of the disclosed compartmentalized nero-thermal coil with regular pipe, according to an embodiment of the present disclosure.

The fact that nichrome has high thermal absorptivity coupled with its coil form, allows the water to heat up in a matter of seconds. Compared to a standard tubular heating coil which lacks compartmentalization, the design allows for greater surface area for the water to come in contact with and thus heat the water. FIG. 5 illustrates a comparison of the disclosed compartmentalized nero-thermal coil 103 with regular pipe, according to an embodiment of the present disclosure. Therefore, the water gets heated within a fraction of second.

Further, the sectioning off the pipe (compartmentalization) creates differences in pressure between the coil, piping, and nozzles in the front. To account for this deviation, a thin water reservoir may be added to the front of the smart showerhead 100. This may allow the water to fill up before spraying out and guarantees consistency in the amounts of water and balance in pressure throughout the water flowing process.

In an embodiment, the smart shower head 100 may further comprise a supplying unit adapted to supply water from the at least one water reservoir to the at least one nozzle 104 in the showering section 101 for showering water.

Figure 6:
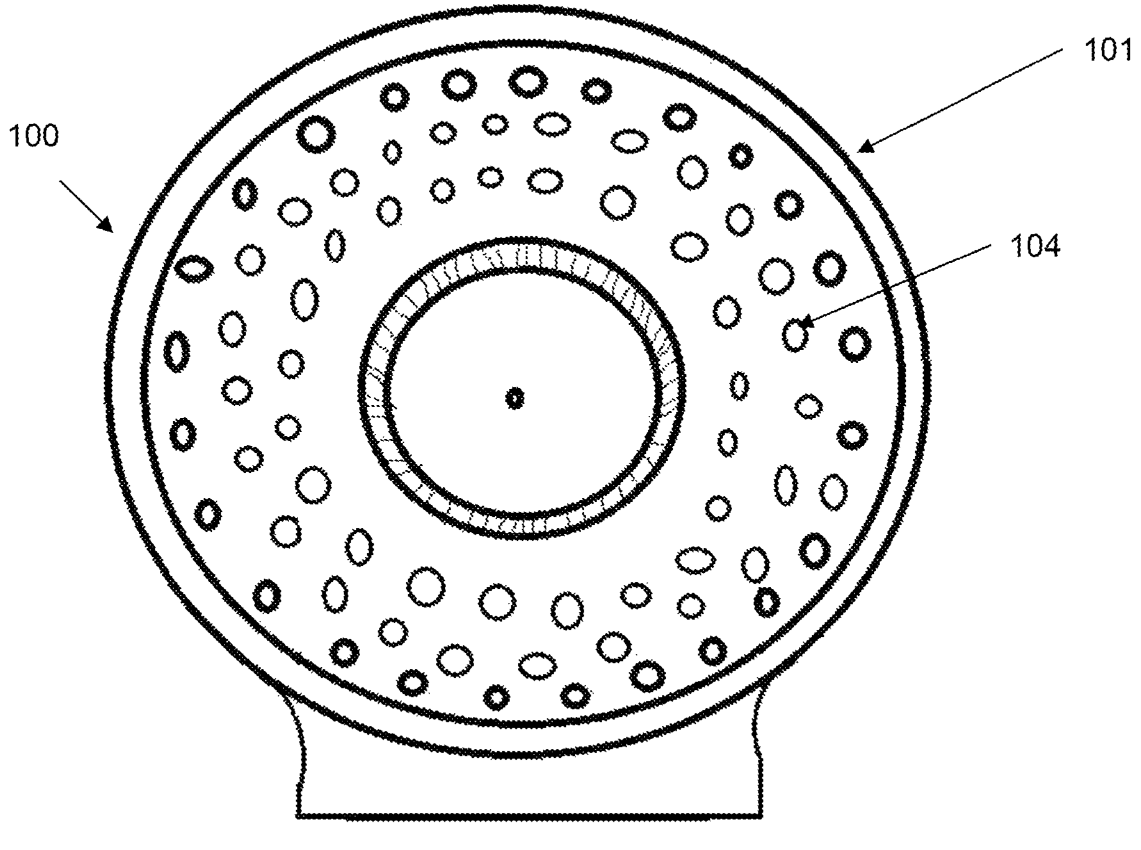
FIG. 6 illustrates a view of nozzles in the showering section of the smart shower head, according to an embodiment of the present disclosure.

In an embodiment, the once the temperature sensors sense hot water entering the shower head arm 102 from the main heating unit, the switching unit may deactivate the temperature regulation unit and the heating action of the smart shower head 100, and mainly the nero-thermal coil 103 comes to an end and the hot water coming directly from the main heating unit is showered by the at least one nozzle 104. FIG. 6 illustrates a view of nozzles 104 in the showering section 101 of the smart shower head 100, according to an embodiment of the present disclosure. In other words, there is an automatic on/off system. The smart shower head 100 is connected with a system that automatically turns it on when the tap is switched on. Within a matter of a few seconds, the hot water will flow out the showering section 101, having been passed through the compartmentalized coil. Once hot water reaches the showering section 101 from the main water heating unit, the smart shower head’s system will be automatically switched off.

Figure 7:
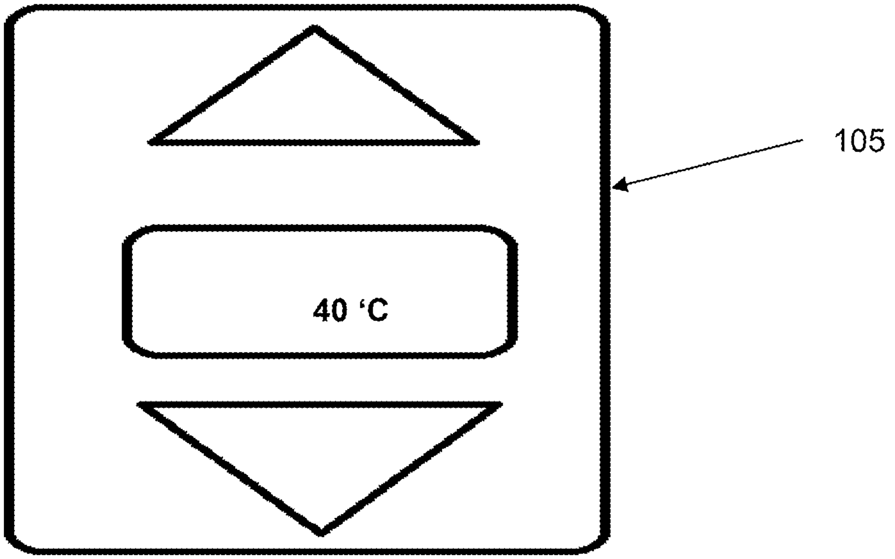
FIG. 7 illustrates a temperature regulator and a switching unit in the smart shower head, according to an embodiment of the present disclosure.

In an embodiment, the bottom face of the shower head arm 102 may comprise a temperature regulator 105. FIG. 7 illustrates a temperature regulator 105, according to an embodiment of the present disclosure. Said temperature regulator 105 controlled by the user may allow for the adjustment of the heating coil’s or nero-thermal coil’s temperature. A stainless steel-finished numerical keypad, located on the bottom face of the shower head arm 102, allows the user to choose his or her desired shower temperature. The underlying technology behind the temperature controller is a mini-chip. This mini-chip receives two inputs: the user’s desired temperature (from the numerical keypad) and the current temperature of the water (from the temperature sensor).

Further, in order to monitor the temperature of the water, the Smart shower head 100 may also comprise an analog temperature sensor. Said analog temperature sensor may be a chip that measures the current ambient temperature of the water and sends the data to the temperature regulator 105 to make the necessary changes.

Figure 8:
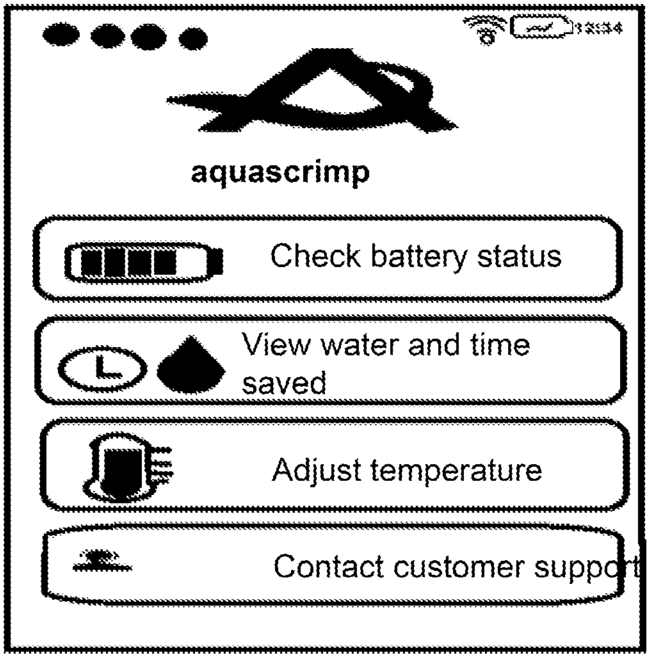
FIG. 8 illustrates a sample smart shower app view for the smart shower head, in accordance with an embodiment of the present disclosure.

Furthermore, for controlling all the operations, there may be a small CPU, designed to transmit and receive signals from the temperature regulator 105 and temperature sensor. The CPU may process all of the temperature-related information and determine the correct temperature of the heating coil (nero-thermal coil 103) based on the user’s input. In an embodiment, the smart shower head 100 may further comprise a bluetooth compatible chip configured to be wirelessly connected to a remote device via a transmitter, wherein the remote device is a smart phone device. In other words, in order for the smart shower head 100 to communicate, Bluetooth connectivity will be incorporated into the shower head 100. FIG. 8 illustrates a sample smart shower app view for the smart shower head 100, in accordance with an embodiment of the present disclosure. The Bluetooth transmission chip will be integrated into the CPU to transmit and receive Bluetooth signals from the user's phone. Bluetooth technology offers users a secure, low-cost, and low-power way to communicate directly with their Smart showerhead, making it the perfect technology to use when developing the Smart Showerhead mobile App.

In an embodiment, the smart shower head 100 may run on a Lithium-Ion battery that powers a heating coil with a temperature regulator 105. The heating coil's main function may be to heat the water before it starts flowing out of the showering section 101. Once the main water heating unit provides hot water, the battery turns off so it can function the next time it is initiated. Finally, the battery works by only providing power in the crucial first two minutes in which water is wasted. Several basic components work together to heat water coming directly from the pipes until the hot water produced by the main heating unit is able to take over, such as, the interior division of the nero-thermal coil 103 into compartments, a reservoir placed in the front of the shower head 100, and a Bluetooth connectivity between the shower head 100 and its mobile app. Smart Shower Head 100 has multiple components that combines existing technologies in a distinguished manner. The shower head 100 includes a non-aerating low flow shower head, a nichrome heating coil, a 12V lithium-ion battery, insulated copper wiring, chrome casing with a stainless-steel finish, battery casing, temperature regulator 105, a temperature sensor, a mini CPU and Bluetooth connectivity via a transmitter.

In an embodiment, the water goes through the water pipe in the smart shower head 100 as usual and enters the shower head arm 102 of the shower head 100. Following the entrance of the water into the shower head arm 102, the water will be heated by an electric heating coil, i.e., nero-thermal coil 103 that efficiently transfers heat from the electric heating coil to the water through its unique compartmentalized design. After water is heated and passed through the compartmentalized heating coils, it exits out of the shower head 100 and comes in contact with the person who is showering through 60 pressurized nozzles 104. To control the temperature of the water, the user can set his/her preferences on a screen that displays the temperature reading during each shower.

The purpose of the water heating coil is to efficiently and uniformly transfer heat to the water. Due to Nero-Thermal technology (the compartmentalized heating coil) the water will continue to remain hot until it comes in contact with the user due to the water's high specific heat capacity (4.184 J/g° C.). As a result, the water will not turn cold immediately after it has been heated. Once water from the main water heating unit finally reaches the showering section 101, the Smart shower head 100 will switch off its heating system and it will function as a normal shower head 100. In addition to the actual shower head 100, an app will be provided to customers to help them monitor and adjust their shower head 100 to ensure the best possible experience. The app would serve to complement the shower head 100 and make the use of Smart shower 100 an overall pleasant and convenient experience. This app may include a temperature regulator 105; the customer may be able to change the final temperature of the water according to their personal preference. It may also include the battery percent and how many showers the consumer will be able to take before its charge runs out (on our wireless version) so that customer can plan accordingly. There may also be the option to begin heating the shower head 100 before the consumer enters the shower (e.g. while they are relaxing on the couch) in order to achieve optimum results. The app may display and analyse data collected over time on the shower head 100 and its usage. The user may be able to view statistics on their shower head 100, such as the amount of water used, the amount of water saved, and the amount of time saved through the Smart shower head 100.

Advantageously, the smart showerhead 100 allows successfully saving the water in the very first minute of time that is neglected by all other shower heads. Although existing shower heads may be green/eco-friendly by lowering their GPM (Gallons Per Minute) to try and consume less water throughout the showering process, this shower head 100 targets a gap in the water management industry that no other shower heads consider. The disclosed smart showerhead 100 follows a new way of thinking for eco-friendly shower heads, in addition to decreasing the amount of water used throughout the shower (decreasing the gpm from the standard 2.5 gallons per minute to 2 or 1.5), the cold water that is otherwise left to go straight down into the drain has been saved. This sets this 'Smart Showerhead' unique from all other existing products.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible.

What is claimed is:

1. A smart shower head to regulate temperature of water being supplied, the smart shower head comprising:

a showering section for showering the water;

a shower head arm connecting the showering section with a water source and supplying the water to the showering section; and at least one compartmentalized nero-thermal coil, wherein the at least one compartmentalized nero-thermal coil is a tubular heating coil partitioned into a plurality of sections, wherein the water flows through the plurality of sections of the tubular heating coil, the tubular heating coil is configured to heat the water flowing through the plurality of sections of the tubular heating coil, and the tubular heating coil runs through the length of the shower head arm and the showering section.

2. The smart shower head of claim 1, wherein the tubular heating coil is made of nichrome.

3. The smart shower head of claim 1, further comprising at least one nozzle in the showering section for showering the water.

4. The smart shower head of claim 1, further comprising at least one water reservoir in the showering section for collecting the water.

5. The smart shower head of claim 4, further comprising a temperature regulator for adjusting the temperature of the tubular heating coil.

6. The smart shower head of claim 1, further comprising a demand sensor for detecting a hot shower demand.

7. The smart shower head of claim 6, wherein the demand sensor is connected to a tap.

8. The smart shower head of claim 6, further comprising:

a switching unit connected to the demand sensor and to a main water heating unit, wherein the switching unit activates a temperature regulation unit on detecting the hot shower demand, and wherein the switching unit deactivates the temperature regulation unit on detecting the inflow of hot water from the main water heating unit.

9. The smart showerhead of claim 1, further comprising a bluetooth compatible chip configured to be wirelessly connected to a remote device via a transmitter, wherein the remote device is a smart phone device.

10. The smart shower head of claim 8, further comprising a lithium ion battery to power the at least one tubular heating coil.

* * * * *